(12) United States Patent
Jenett et al.

(10) Patent No.: US 11,001,319 B2
(45) Date of Patent: May 11, 2021

(54) MOBILE ROBOT FOR LOCOMOTION THROUGH A 3-D PERIODIC LATTICE ENVIRONMENT

(71) Applicant: Massachusetts Institute of Technology, Cambridge, MA (US)

(72) Inventors: Benjamin Jenett, Cambridge, MA (US); Daniel Cellucci, Portland, OR (US); Kenneth Cheung, Emerald Hills, CA (US); Neil Gershenfeld, Cambridge, MA (US)

(73) Assignees: Massachusetts Institute of Technology, Cambridge, MA (US); United States of America, as Represented by the Administrator of NASA, Washington, DC (US)

( * ) Notice: Subject to any disclaimer, the term of this patent is extended or adjusted under 35 U.S.C. 154(b) by 194 days.

(21) Appl. No.: 16/144,144

(22) Filed: Sep. 27, 2018

(65) Prior Publication Data
US 2019/0118390 A1    Apr. 25, 2019

Related U.S. Application Data

(60) Provisional application No. 62/574,689, filed on Oct. 19, 2017.

(51) Int. Cl.
*B62D 57/024*     (2006.01)
*B25J 9/00*        (2006.01)
(Continued)

(52) U.S. Cl.
CPC .......... *B62D 57/024* (2013.01); *B25J 9/0009* (2013.01); *B25J 9/02* (2013.01); *B25J 9/102* (2013.01);
(Continued)

(58) Field of Classification Search
CPC .................................................. B62D 57/024
See application file for complete search history.

(56) References Cited

U.S. PATENT DOCUMENTS

| 4,738,583 A | * | 4/1988 | Macconochie | ............ B25J 5/00 |
| | | | | 180/8.6 |
| 5,145,130 A | * | 9/1992 | Purves | ........................ B25J 5/00 |
| | | | | 244/159.4 |

(Continued)

OTHER PUBLICATIONS

K.C. Cheung and N. Gershenfeld, "Reversibly assembled cellular composite materials," Science, vol. 341, No. 6151, pp. 1219-1221, 2013, USA.

(Continued)

*Primary Examiner* — Kevin Hurley
(74) *Attorney, Agent, or Firm* — Flachsbart & Greenspoon, LLC; Robert Greenspoon

(57) ABSTRACT

A class of robots specifically adapted to climb periodic lattices. These "relative robots" are designed for a specific lattice structure and use the regularity of the structure to simplify path planning, align with minimal feedback, and reduce the number of degrees of freedom (DOF) required to locomote. These robots can perform vital inspection and repair tasks within the structure that larger truss construction robots cannot perform without modifying the structure. A particular embodiment is a robot designed to traverse a cubooctahedral (CubOct) cellular solids lattice using only two motions: climbing and turning.

19 Claims, 6 Drawing Sheets

(51) Int. Cl.
  *B25J 9/02*   (2006.01)
  *B25J 18/00*  (2006.01)
  *B25J 11/00*  (2006.01)
  *B25J 13/00*  (2006.01)
  *B25J 15/00*  (2006.01)
  *B25J 9/10*   (2006.01)
  *B25J 15/02*  (2006.01)

(52) U.S. Cl.
  CPC .......... *B25J 11/008* (2013.01); *B25J 13/006* (2013.01); *B25J 15/0028* (2013.01); *B25J 15/0206* (2013.01); *B25J 18/00* (2013.01); *B25J 15/0213* (2013.01)

(56) References Cited

U.S. PATENT DOCUMENTS

| | | | | |
|---|---|---|---|---|
| 5,551,525 | A * | 9/1996 | Pack .................. | B62D 57/024 180/8.6 |
| 6,527,071 | B1 * | 3/2003 | Villedieu ............ | B62D 57/024 180/8.1 |
| 8,534,395 | B2 * | 9/2013 | Niederberger ...... | B62D 57/024 180/8.6 |
| 10,046,820 | B2 * | 8/2018 | Jenett ................. | B25J 9/1682 |
| 2014/0300211 | A1 * | 10/2014 | Peek .................. | H02K 41/03 310/12.17 |
| 2020/0156237 | A1 * | 5/2020 | Tang .................. | B25J 9/10 |

OTHER PUBLICATIONS

B. Jenett, K.C. Cheung and S. Calisch, "Digital Morphing Wing: Active Wing Shaping Concept Using Composite Lattice-based Cellular Structures," Soft Robot, vol. 3, No. 3, 2016, USA.
B. Jenett, D. Cellucci, C. Gregg and K.C. Cheung, "Meso-scale digital materials: modular, reconfigurable, lattice-based structures," in Manufacturing Science and Engineering Conference, 2016, USA.
T.A. Schaedler, A.J. Jacobsen and W.B. Carter, "Materials science. Toward lighter, stiffer materials," Science, vol. 341, No. 6151, 2013 USA.
K.C. Cheung, Thesis: "Digital Cellular Solids: reconfigurable composite materials," Massachusetts Institute of Technology, 2012 USA.
P.J. Staritz, S. Skaff, C. Urmson and W. Whittaker, "Skyworker: A robot for assembly, inspection and maintenance of large scale orbital facilities," Proceedings—IEEE International Conference on Robotics and Automation, vol. 4, 2001 Korea.
W.R. Doggett, "Robotic Assembly of Truss Structures for Space Systems and Future Research Plans," IEEE Aerospace Conference, 2002 USA.
K.C. Galloway, R. Jois and M. Yim, "Factory floor: A robitically reconfigurable construction platform," Proceedings—IEEE International Conference on Robotics and Automation, 2010 USA.
F. Nigl, S. Li, J.E. Blum and H. Lipson, "Structure-reconfiguring robots: Autonomous truss reconfiguration and maniuplation," IEEE Robotics & Automation Magazine, vol. 20, No. 3, pp. 60-71, 2013 USA.
Y. Yoon and D. Rus, "Shady3D: A Robot that Climbs 3D Trusses," IEEE International Conference on Robotics and Automation, 2007 Italy.
C. Balaguer, A. Giminez and C. Abderrahim, "ROMA robots for inspection of steel based infrastructures," Industrial Robot: An International Journal, vol. 29, No. 3, pp. 246-251, 2002 USA.
N.W. Ashcroft and N.D. Mermin, Solid State Physics, vol. 2, pp. 92-93, ISBN 0-471-92805-4, 1976 USA.

* cited by examiner

PRIOR ART

MOBILE ROBOT FOR LOCOMOTION THROUGH A 3-D PERIODIC LATTICE ENVIRONMENT

This application is related to, and claims priority from, U.S. Provisional Patent Application No. 62/574,689 filed Oct. 19, 2017. Application 62/574,689 is hereby incorporated by reference in its entirety.

This invention was made with Government support under contract numbers NNX16AP66G, NNX14AM40H and NNX14AG47A, each awarded by the National Aeronautics and Space Administration (NASA). The Government has certain rights in the invention.

BACKGROUND

Field of the Invention

The present invention relates generally to the field of small robot devices and more particularly to a mobile robot for locomotion through a 3-dimensional lattice.

Description of the Problem Solved

Various types of lattice assemblies are being proposed for space construction and other applications such as deep water. It is particularly desirable if robots can construct these structures and later traverse them to perform repair or other tasks on them. In fact, dedicated robots capable of traversing the assembled structure and performing inspection and repair have been identified as a critical component in these systems.

One type of lattice system is known as digital cellular solid assembly. This technology produces 3-dimensional frameworks made from many identical building blocks that are then assembled together using reversible mechanical connections. These types of structures have been demonstrated in aerospace applications. Their building process is straightforward to automate. They form materials with desirable traits including reparability, reconfigurability and customizable anisotropic mechanical properties.

Framework construction robots perform a task similar to the assembly of digital cellular solid lattices. These robots typically have a multiple degrees-of-freedom (DOF) manipulator mounted on a gantry or other locomotion platform that assembles a structure from frame elements and nodes. These robots have been proposed as constructors for use within the above-mentioned hazardous or remote environments. In addition to construction robots, there are also numerous types of truss climbing robotic platforms known in the art. Many of these are used to traverse existing trusses and structures to perform specific tasks. Such robotic truss traversal focuses on the local geometry of the framework—struts and nodes. These robots typically use a single manipulator which is able to locomote along a strut, either through swinging, wheels, or with bidirectional gearing. Two of these manipulators connected with a hip joint allow the robot to transfer from one strut to another.

Because construction robots typically mount on the outside of the structure, and previous strut traversal robots can be quite limited in their capabilities, it would be particularly advantageous to have a robot that could locomote and perform a repair on a failed element, or other item, in the middle of a volume of assembled structure. This avoids disassembly of an entire section of the structure to separate the failed element or item. Such a robot could be made with a much-simplified design if the robot is designed relative to the structure it will traverse, in particular if it is designed to locomote on a digital cellular solid assembly such as a 3-dimensional cellular solids lattice.

SUMMARY OF THE INVENTION

The present invention relates to a robot designed to traverse and inspect cellular solids lattices. The disclosed embodiments describe a robot that can traverse a particular type of known lattice: the CubOct lattice. However, similar robots using the principles of the present invention can traverse other lattices. The robot of the present invention is uniquely adapted to the periodic lattice geometry through which it moves. These adaptations allow it to simplify its path planning, align with minimal feedback, and to locomote with fewer degrees of freedom that prior art truss traversal platforms. The present invention describes a new class of robotic systems called "Relative Robots". They are robots that are designed relative to the structure they traverse. These robots can move anywhere in or within the structure.

The relative robot of the present invention has two capabilities in order to traverse the lattice: it is able to move forward in the direction it is facing (climbing for example), and it is able to reorient itself with the lattice to change the direction it is facing (turning). To satisfy these two requirements, the robot has three mechanisms: two identical arm mechanisms responsible for gripping and translating, and an actuated hip that rotates about the cube diagonal axis. Due to the periodicity of the digital cellular solid lattice, 3-dimensional traversal requires only two motions: climbing and turning. The robot of the present invention uses the structure itself as an alignment mechanism, thus requiring minimal feedback allowing the robot to locomote with five degrees of freedom.

DESCRIPTION OF THE FIGURES

Attention is now directed to several drawings that illustrate features of the present invention.

Several figures and illustrations have been provided to aid in understanding the present invention. The scope of the present invention is not limited to what is shown in the figures.

DESCRIPTION OF THE PREFERRED EMBODIMENTS

Figure 1A:
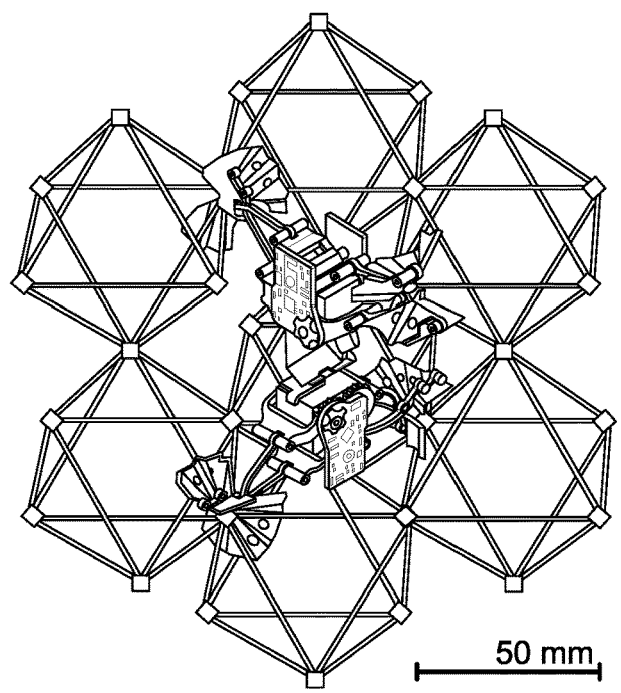
FIG. 1A shows two multi-objective robots in a lattice structure.
Figure 1B:
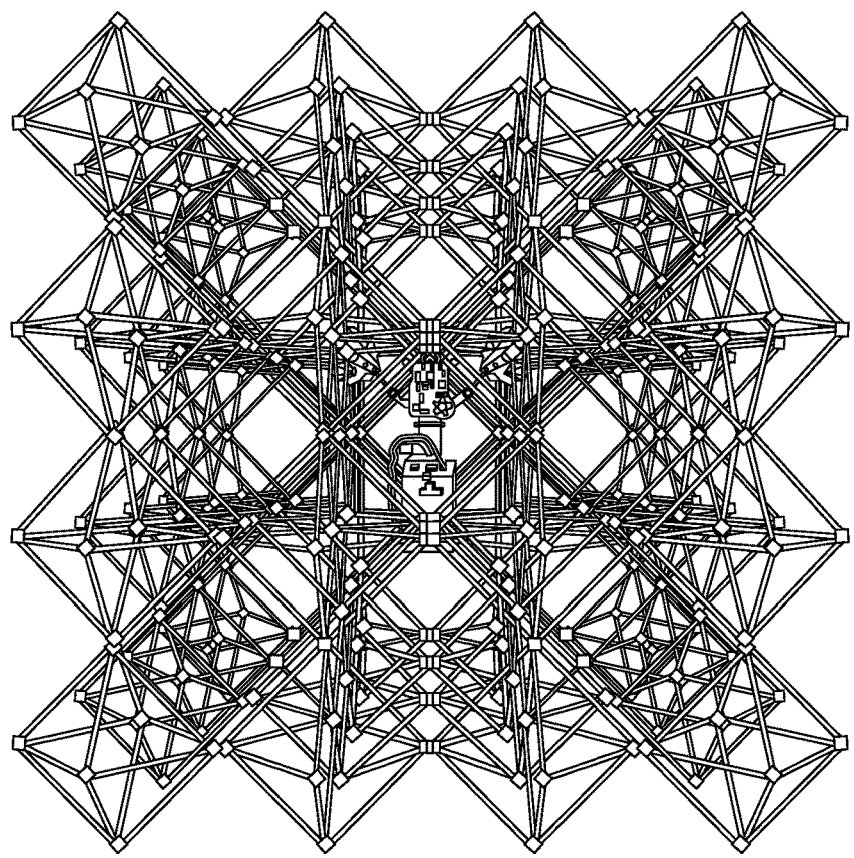
FIG. 1B shows a multi-objective robot in a larger lattice structure.

The present invention relates to a particular robot designed to traverse and inspect cellular solids lattices and embodiments of the invention traverse a particular type of cellular solids lattice known as the CubOct lattice. FIG. 1 depicts an embodiment of the robot traversing a lattice structure. FIG. 1A shows two separate robots, one above the other. It can be seen that the robots need to both climb and turn in order to locomote through this sample lattice. Due to the periodicity of the lattice, 3-dimensional traversal requires only these two motions. FIG. 1B shows a robot of FIG. 1A in a much larger lattice.

The robot of the present invention has both of these capabilities; it is able to move forward in the direction it is facing (climb), and it is able to reorient itself with the lattice to change the direction it is facing (turn). The robot uses the structure itself as an alignment mechanism, thus requiring minimal feedback allowing the robot to locomote.

Figure 2:
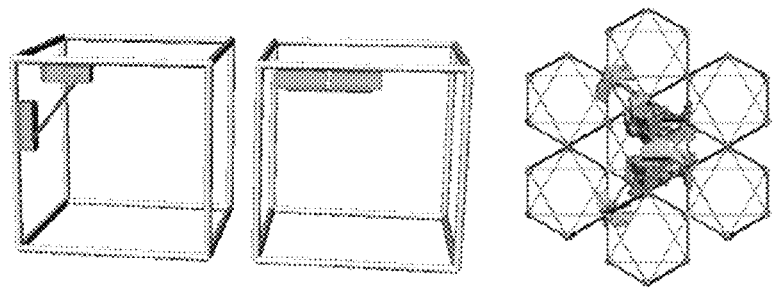
FIG. 2 compares robotic locomotion systems for truss climbing with the relative robot of the present invention.

It is enlightening to compare robotic locomotion from a prior art example with the locomotion of the present invention. FIG. 2 shows an example of a prior art truss climbing robot system on the left compared with the relative robotic system of the invention on the right. The robot on the left can move along a strut, and can change directions from a vertical strut to a horizontal strut. It does not however have the capability to traverse the lattice shown on the right.

The use of a digital cellular solid lattice, a geometry that can be defined by a translationally-invariant unit cell and parts with identical physical interfaces, allows a unique design for the robot that is relative to the lattice that it will traverse. This results in three qualities: path simplification, minimal feedback and reduced mechanical complexity.

Path simplification is due to the periodicity of the digital cellular solid allowing the 3-dimensional traversal to be decomposed into two discrete motions (climbing and turning) to reach any location or orientation in the structure. Minimal feedback results from the robot using the structure as an alignment mechanism, reducing the likelihood of failed grips. Hence, the robot does not require any sensors to navigate (though sensors may be employed for redundancy or other purposes). Reduced mechanical complexity results because the robot is able to locomote with only five degrees of freedom (DOF). It is implicit however, that the size of the robot scales with that of the unit cell of the lattice being constructed or traversed. Thus, different sized robots must be constructed for different sized lattices.

Methodology

Figure 3:
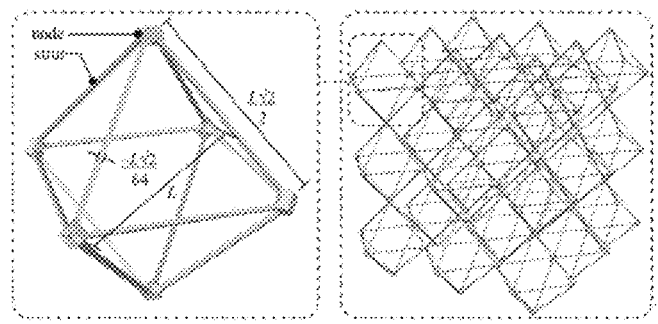
FIG. 3 shows examples of octahedral voxel geometry and a 3-D lattice structure having 3×3×3 voxels.

A particular example of a CubOct lattice consists of vertex-connected octahedra connected in a cubic array. A single unit cell of this structure is referred to as a "voxel" or volumetric pixel. FIG. 3 shows an example building block voxel on the left and a 3×3×3 cube of voxels on the right. A particular example of such a lattice has voxels with a lattice pitch L of 76.2 mm (3.0 inches) and a strut length of 53.88 mm (2.12 inches). The strut has a square cross section with a side length of 1.5 mm (0.056 inches). The parts are injection molded Zytel reinforced with 30% chopped glass fiber, and are joined using 0-80 screws and nuts. This represents a typical example of a CubOct lattice; however, CubOct lattices can be made in any sizes and of many different materials.

Figure 4:
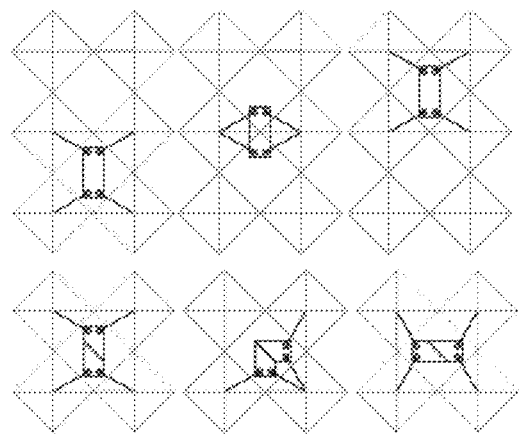
FIG. 4 illustrates the CubOct relative robot primary functionality.

As previously stated, the robot requires two capabilities in order to traverse the lattice; it must be able to move forward in the direction it is facing (called climbing), and it must be able to reorient itself within the lattice to change its facing (called turning). FIG. 4 shows this primary functionality. At the top, the robot is shown schematically climbing, while at the bottom it is shown turning. The symmetry of the lattice can be used to simplify the motions that produce the two capabilities, for instance, by rotating about the cube diagonal (111)-axis, a robot oriented along one of the principal directions of the lattice can reorient itself along any of the other principal directions. This leads to a robot design with two identical arm mechanisms responsible for gripping and translating, connected to an actuated hip that rotates about the cube diagonal axis.

The arm mechanism must be able to reach three states: engaged outward, where it is gripping the structure furthest from the hip; engaged inward, where it is gripping the structure closest to the hip; and disengaged, where it is not touching the structure and free to move. In order to traverse the lattice, the distance between engaged outward and engaged inward states must be a minimum of half a unit cell distance. If the two mechanisms are separated by half a unit cell distance as well, then the motion between the two engaged states is symmetric which simplifies the path planning. Referring to the arm mechanism located above the hip as "top", and the mechanism below the hip as "bottom", the sequence of states required to produce motion from the center of one unit cell to the next is as follows:

1. BOTTOM ENGAGED OUTWARD,
2. TOP ENGAGED OUTWARD.
3. BOTTOM DISENGAGED,
4. TOP ENGAGED INWARD,
5. BOTTOM ENGAGED INWARD,
6 TOP DISENGAGED,
7 GO TO 1.

Combined with the arm mechanisms, the hip requires two states in order to be able to allow the robot to reorient itself within the structure: straight, where the two arm mechanisms are aligned along the same axis, and twisted, where the arm mechanisms are now aligned along two different principal axes. In order to reorient itself along a new principal axis, the sequence of states is as follows:

1. BOTTOM ENGAGED OUTWARD,
2 HIP STRAIGHT,
3. TOP ENGAGED OUTWARD,
4 BOTTOM DISENGAGED,
5 HIP TWISTED,
6 BOTTOM ENGAGED OUTWARD,
7 TOP DISENGAGED,
7 GO TO 2.

This twisting corresponds to a 120 degree rotation about the cube diagonal axis (111 axis), and by repeating three twists, the robot can rotate completely around in the unit cell.

Mechanical Subsystems

Figure 5:
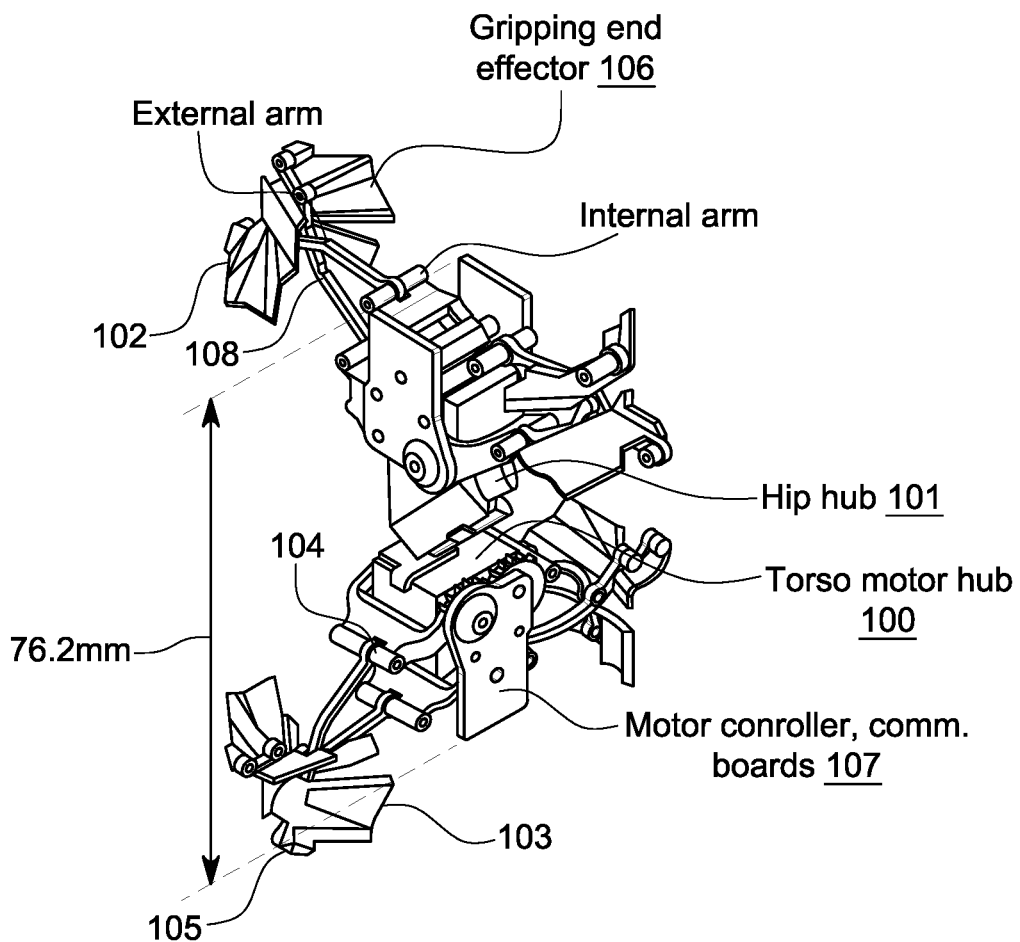
FIG. 5 shows overall robot components and general dimensions of a particular embodiment.

FIG. 5 shows an overview of the robot components. A torso motor hub (100) is connected to the hip hub (101) and to the arms (102, 103). Each arm includes an internal portion (104) and an external portion (105). The external portion (105) is connected to the gripping end effector mechanism (106). A control board (107) that includes motor control and communication is attached to the torso motor hub.

Figure 6:
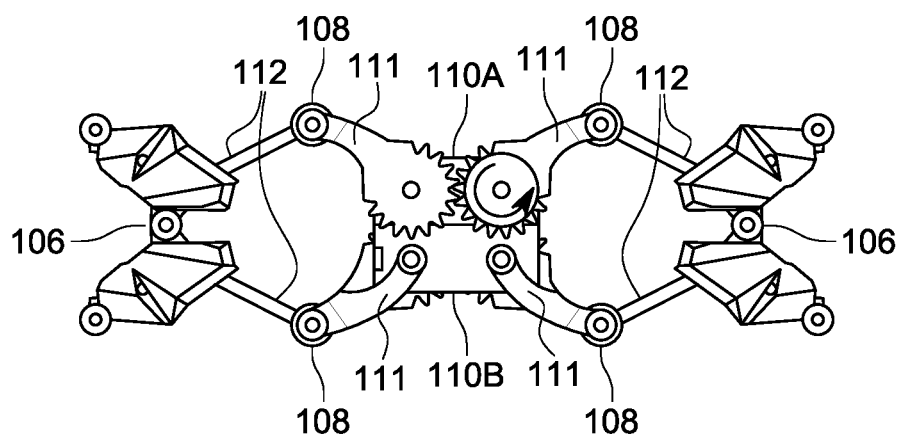
FIG. 6 shows details of an arm structure.

There are two mechanical subsystems: the linkages (108) that perform the engaging and disengaging motions for the arm mechanisms, and the end-effectors (106) that interface between the linkages and the lattice. This is shown in FIG. 6.

In a particular embodiment, the arm linkage is a pantograph mechanism, which allows it to grip onto the lattice and also sufficiently retract when disengaged. This linkage is actuated by two Hitec HS-5035MG servos, and is symmetric about the vertical axis. A gear ensures that the two sides of the arm mechanism set are kinematically connected. FIG. 6 shows both servos (110a, 110b) that drive a pair of geared inner arms (111), one set on the upper front and one set on the lower back. These then drive the passive outer arms (112) which then actuate the gripping end effectors (106). The gripping end effector on each arm has two halves that close. Each half is driven by a servo coupled to that half by a linkage.

The lengths of the bars for the arm linkages can be chosen to reach the required range of motion without over extending (38.1 mm in the particular embodiment), and still retract without interfering with the structure. The dimensions are constrained by the interference between the servo actuating the hip and the interior arms. In the particular embodiment, this limited the maximum angle the interior arms could reach to 25 degrees form the vertical axis.

The final dimensions of the mechanism, and the maximum angle of the interior arms, allows the calculation of the shape of the end effectors (106). The end effectors act like fingers that, with their large surfaces, grip both the node and the surrounding area of the structure in order to provide reinforcement during climbing. The regularity of the physical dimensions of the structure allows optional grooves in the effectors corresponding to the location of the structure at the endpoints in the motion. These optional grooves help align the robot while switching between the extended states.

Figures 7A, 7B:
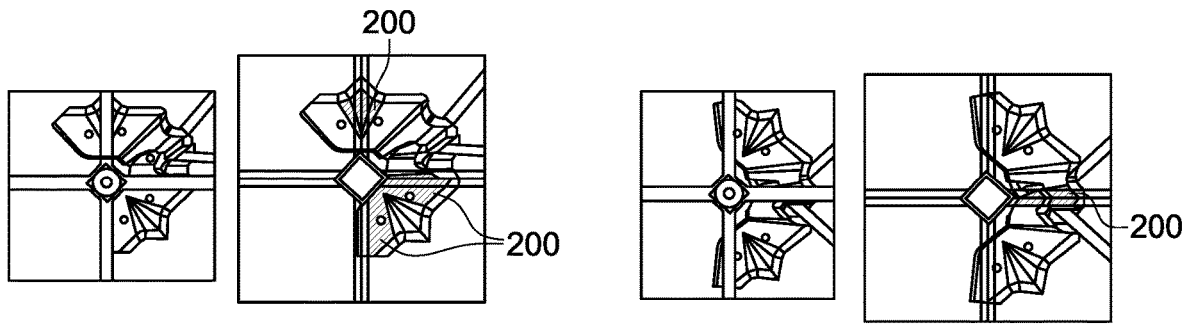
FIGS. 7A-7C show the main steps used to climb.
Figure 7C:
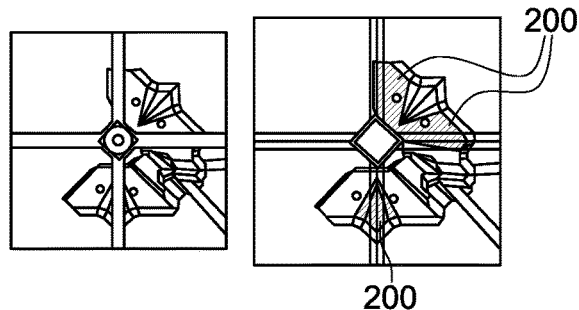

FIG. 7 shows the main configuration steps of the effectors used to climb. At the left in each segment is a drawing of the robot making the traversal; at right in each segment is a diagram with areas interfacing the lattice marked (200). At bottom, the effector (climbing vertically) encounters the node; in the center, it moves around the node, and at top it has passed the node.

Electrical Subsystem

Figure 8:
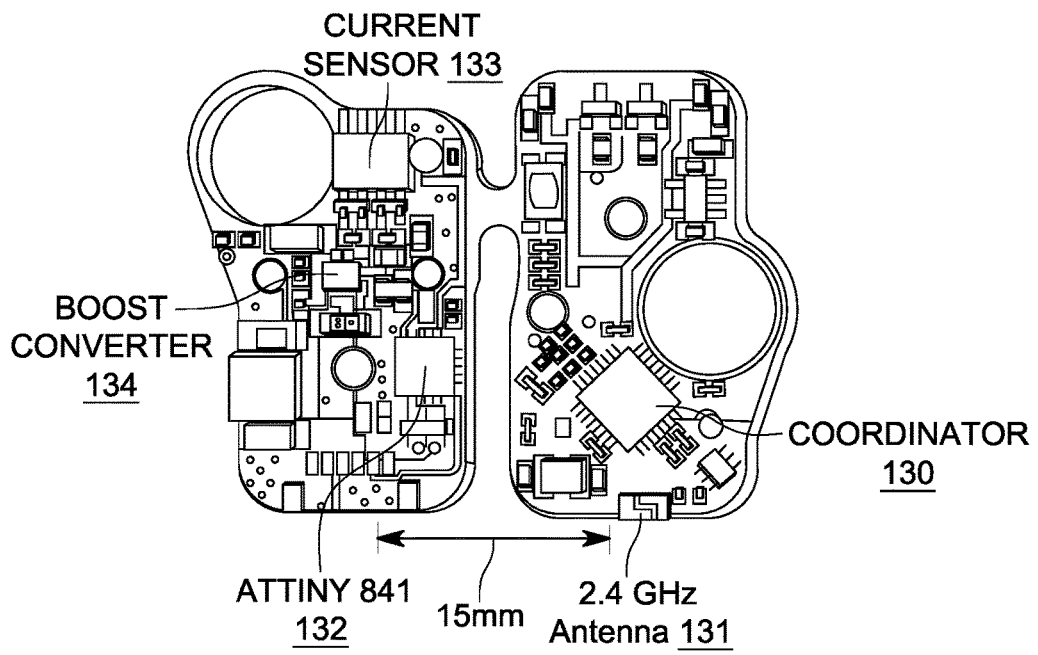
FIG. 8 shows an example of a power board and a communication/control board.

The electrical subsystem includes two parts: a control system that translates high-level commands to motor positions and optionally senses power consumption through a current sensor, and the power system which boosts the input voltage to the operating voltage of the motors. FIG. 8 shows an embodiment of a power board and a control board.

The control system for the particular embodiment uses an Atmel ATSAMR21 ARM Cortex-M0+ based 32-bit microcontroller (130), a 2.4 GHz RF transceiver (131) and two Atmel ATtiny841 8-bit microprocessors (132). Commands are routed and communication with the 8-bit processors takes place over an I2C bus. The 841s (132) each control an arm set, with one also controlling the hip servo. This is done using three PWM channels controlled though an internal timer. The 841s (132) can also read an analog voltage value corresponding to the present current consumption from an Allegro Microsystems ACS712 Hall Effect current sensor (133).

The power system in this embodiment includes a Texas Instruments TI61089 Synchronous boost converter (134) designed to step the typical operating voltage of a lithium-polymer battery, 3.7V to 4.8V. The TI61089 can deliver more than 90% efficiency at an operating current of 2 A. On full charge, the batteries last between 20-30 minutes.

The boards housing the control and power systems shown in FIG. 8 double as mounting plates for the arm mechanism to the servo. This is achieved with a set of steel dowel rods which are epoxied into place and around which the arms pivot, and an additional bolt to prevent the mechanism from slipping.

Figure 9:
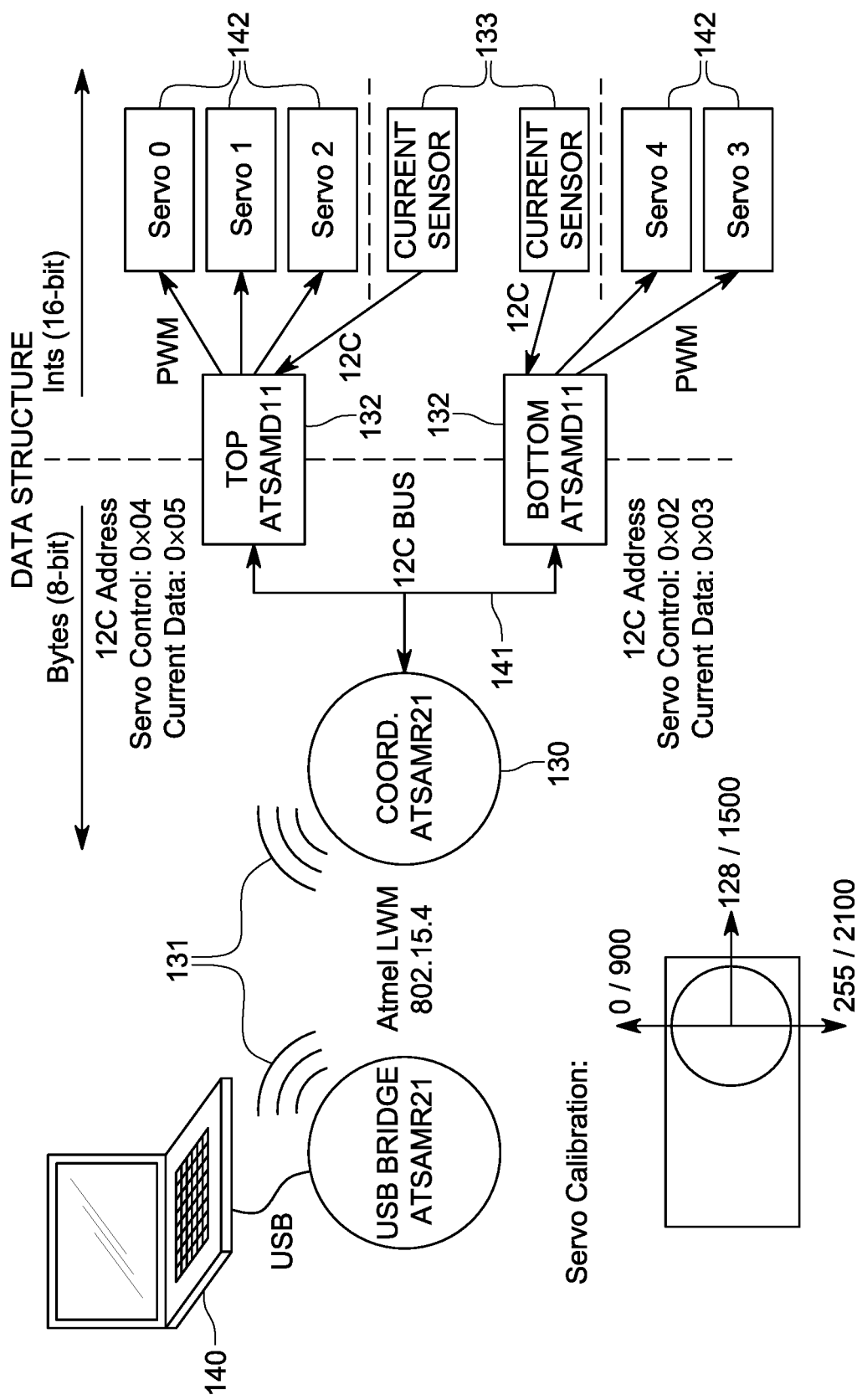
FIG. 9 is a block diagram of an embodiment of the robot system.

FIG. 9 shows a block diagram of the system. A remote computer (140) communicates wirelessly (131) with the ARM processor 130 which in turn communicates over a bus (141) with the two Atmel processors (132). These control servos (142) using a pulse-width modulation (PWM) signaling technique. These processors can also read the analog current sensor (133).

Testing of the Prototype Embodiment

The following locomotion experiments were performed: climbing vertically, climbing horizontally and turning. The difference between climbing vertically and horizontally is the orientation of the gravity vector and the robot; in vertical climbing, gravity is aligned with the direction of motion and does not impact the alignment of the robot, but in horizontal climbing, gravity applies a torque to the robot causing a risk of misalignment.

In both locomotion experiments, the robot traversed two unit cells by transitioning between the motor coordinates corresponding to the movement states. The initial experiments attempted to directly transition between states without interpolation, but it was determined that the arms could not move through the structure without intermediate positions to avoid interference with the structure. The final motion was an interpolation between key frames, performed in open loop, autonomously after an initializing command was sent.

The worst case horizontal climbing position is when the robot is fully extended and only contacted the structure with a set of arms oriented perpendicular to the gravity vector. The torque from the cantilevered mass of the robot is applied through the kinematic chain of the arm mechanism to find the resulting back-torque on the servos. In the particular embodiment of the prototype, a torque of 0.33 kg·cm to the inner servo and 0.76 kg·cm to the outer was computed. The stall torque of the servos is 0.8 kg·cm. This back-torque is close enough to produce an observed misalignment. This can be alleviated by using a different servo, or limiting the angle to gravity at which horizontal climbing takes place. In low gravity or high buoyancy environments, such risk of horizontal misalignment is reduced or eliminated, and may not require mitigation strategies.

SUMMARY

The present invention is a methodology for designing a CubOct or other lattice relative robot. While, the embodiments herein described only traversed the CubOct periodic lattice, relative robots can be lattice-designed for other symmetric lattices. The key to relative robot technology is that very capable robots can be designed to take advantage of the periodicity and symmetry of a particular lattice type providing opportunities to reduce the number of degrees of freedom in the robot, simplify the robot mechanism, and reduce the complexity of the path planning.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A relative robot adapted to locomote in a 3-dimensional cellular solids lattice comprising:
   a torso motor hub;
   a hip hub attached to the torso motor hub having at least two states: a straight state and a twisted state;
   two arms coupled to the hip hub, each arm having at least three states: engaged inward, engaged outward and disengaged;
   wherein, in the engaged inward state, each arm is constructed to grip first lattice structure near the hip hub;

wherein, in the engaged outward state, each arm is constructed to grip second lattice structure more removed from the hip hub than the first lattice structure;

wherein, in the disengaged state, each arm is constructed to not touch the lattice; and, wherein, the hip hub and two arms cooperate to traverse the lattice by moving in a climbing mode and a turning mode; the climbing mode being where the robot moves in a direction it faces, and the turning mode being where the robot reorients itself within the lattice to change the direction it faces.

2. The relative robot of claim 1, wherein the two arms are first and second arms, the robot moving in a climbing mode by manipulating the first and second arms sequentially as follows:

the first arm is engaged outward;
the second arm is engaged outward;
the first arm is disengaged;
the second arm is engaged inward;
the first arm is engaged inward;
the second arm is disengaged.

3. The relative robot of claim 1, wherein the two arms are first and second arms, the robot moving in a turning mode by manipulating the first and second arms and the hip hub sequentially as follows:

the first arm is engaged outward;
the hip hub is straight;
the second arm is engaged outward;
the first arm is disengaged;
the hip hub is twisted;
the first arm is engaged outward;
the second arm is disengaged.

4. The relative robot of claim 1, wherein each of the two arms is equipped with a gripping end effector.

5. The relative robot of claim 4, wherein the gripping end effector on each arm has two halves, each half driven by a servo coupled to that half by a linkage.

6. The relative robot of claim 1, wherein each arm extends a distance of one half of a lattice unit cell between the engaged outward state and the engaged inward state.

7. The relative robot of claim 1, further comprising a control system adapted to receive high level commands from a remote computer over a wireless link.

8. The relative robot of claim 7, wherein the control system includes a processor executing stored instructions.

9. The relative robot of claim 8, wherein the processor drives at least two servo-connected processors that each control one of the arms.

10. The relative robot of claim 1, wherein the 3-dimensional cellular solids lattice is a cuboctahedral lattice (CubOct).

11. The relative robot of claim 1, wherein the robot has 5 degrees of freedom.

12. A robot constructed to locomote on a symmetric 3-dimensional lattice comprising a hip hub having at least two states and an arm mechanism having at least three states; wherein, the two states of the hip hub are straight and twisted, and the three states of the arm mechanism are engaged outward, engaged inward and disengaged; and wherein, the robot traverses the lattice in a climbing mode and a turning mode, the climbing mode executed by manipulating the three states of the arm mechanism, and the turning mode executed by manipulating the states of the hip hub as well as the states of the arm mechanism.

13. The robot of claim 12, wherein the arm mechanism consists of a first and second arm, and in the climbing mode, the robot manipulates the three states of the arm mechanism as follows:

the first arm is engaged outward;
the second arm is engaged outward;
the first arm is disengaged;
the second arm is engaged inward;
the first arm is engaged inward;
the second arm is disengaged.

14. The robot of claim 12, wherein the arm mechanism consists of a first and second arm, and in the turning mode, the robot manipulates the two states of the hip hub and the three states of the arm mechanism as follows:

the first arm is engaged outward;
the hip hub is straight;
the second arm is engaged outward;
the first arm is disengaged;
the hip hub is twisted;
the first arm is engaged outward;
the second arm is disengaged.

15. The robot of claim 12, wherein the 3-dimensional symmetric lattice is a 3-dimensional cellular solids lattice.

16. The robot of claim 15, wherein the 3-dimensional cellular solids lattice is a cuboctahedral lattice (CubOct).

17. The robot of claim 12, further comprising a control system adapted to receive high level commands from a remote computer over a wireless link.

18. The robot of claim 17, wherein the control system includes a processor executing stored instructions.

19. The robot of claim 18, wherein the processor drives at least two servo-connected processors that control the arm mechanism.

\* \* \* \* \*